Patented Feb. 21, 1939

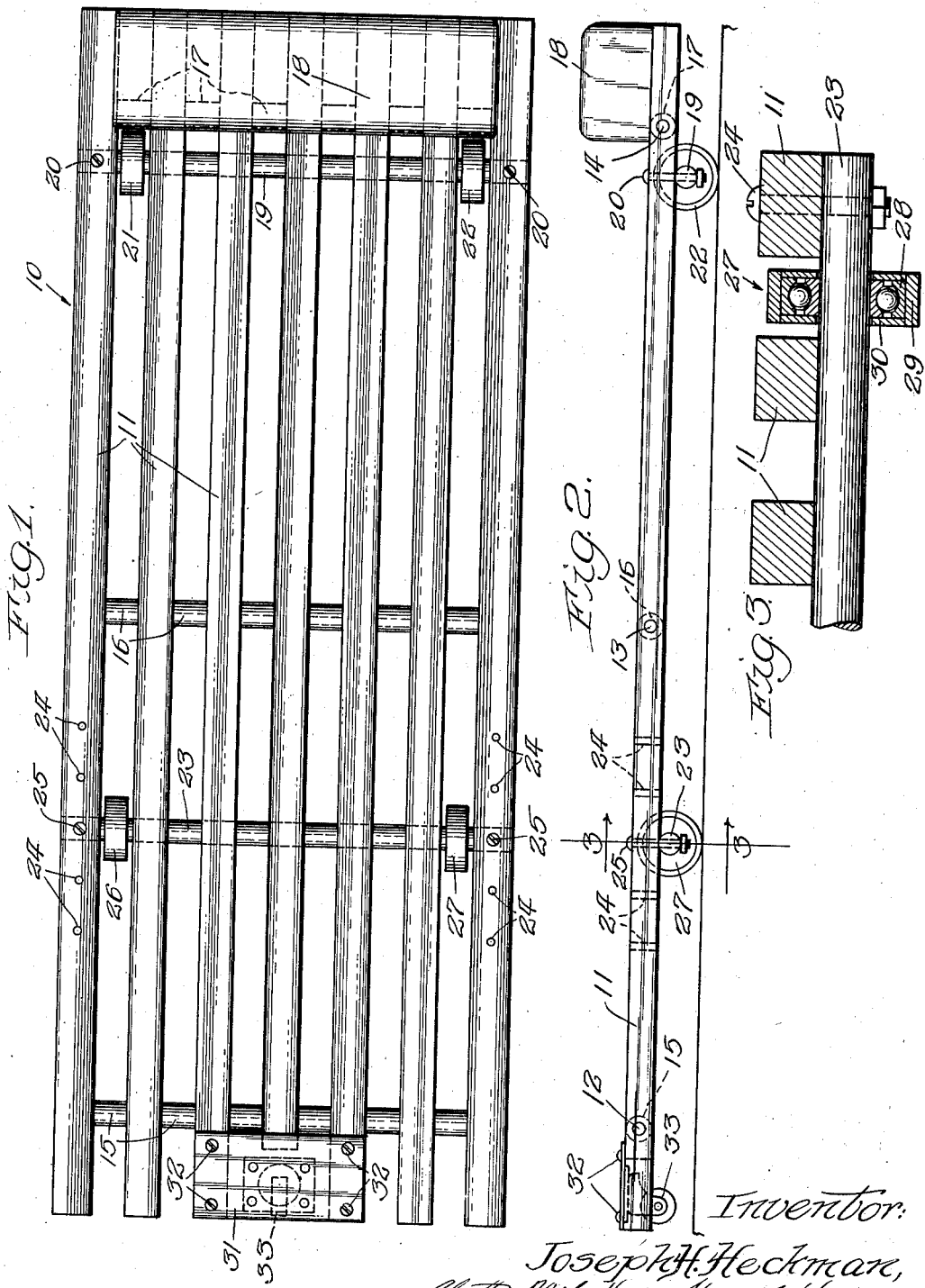

2,148,199

UNITED STATES PATENT OFFICE 2,148,199

MECHANIC'S CREEPER

Joseph H. Heckman, Chicago, Ill.

Application June 23, 1937, Serial No. 150,001

5 Claims. (Cl. 280—61.5)

The present invention relates to a mechanic's creeper of the type adapted to support a person in reclining position for work beneath an automobile or the like.

One feature of this invention is that it is of exceptionally sturdy and long-lived construction; another feature of this invention is that it is designed to normally roll in one direction only, preferably longitudinally of the device; yet another feature of this invention is that it is so constructed that the direction of movement may be readily changed, and the device may be even spun at one point, if desired; a further feature is that the upper surface of the device is very close to the surface on which it rests; yet another feature of this invention is that it provides a device exceptionally light in weight and readily carried from job to job; other features and advantages of this invention will be apparent from the following specification and the drawing, in which:

Fig. 1 is a top plan view of a creeper embodying this invention; Fig. 2 is a side elevation of the same device; and Fig. 3 is a detailed view of the axle and wheel construction, along the line 3—3 of Fig. 2.

Mechanics' creepers of various forms, designed to permit a mechanic to work in a reclining position on the creeper beneath an automobile, have been used for some years. These creepers have been open to serious objections in several respects, however. In the first place, it has been customary to use pivotally mounted wheels or casters at each of the four corners of the creeper frame to support the device, so that it might be rolled in any desired direction, or even spun around in one place. These casters, in the small size necessary to keep the creeper close enough to the floor on which it is to run, have been found to be very unsatisfactory from a standpoint of length of life. It is very seldom that such casters last more than a month in a garage where a creeper is given any substantial use. Moreover, when a mechanic is attempting to draw up on bolts or the like underneath a car, he has to brace himself to withstand the full amount of pull with his free hand, or with that and his feet. These casters are generally so small and relatively frail, moreover, that any attempt to move heavy loads on the creeper, such as a motor removed from a car, or the accidental running over of one end of the creeper by an automobile, are sure to break them.

These difficulties are all accentuated by the fact that modern cars are being built with less and less clearance above the ground, so that the creepers must be made with as little clearance as practicable in order to permit a man to easily slide under the running board of a car thereon. This necessitates, of course, the use of very small casters or pivotally mounted wheels, instead of larger ones which would be preferable from a structural standpoint. Even with small casters, the upper surface of a creeper built in this manner cannot be less than two and one-half or three inches above the floor, since the full diameter of the caster wheels, plus sufficient space for a pivotal mounting, must exist below the lower surface of the frame of the device.

The present invention obviates these and other difficulties by providing a creeper with a frame having four fixedly mounted wheels thereon of very sturdy construction, which wheels normally carry the load of a person reclining on the device. These wheels are fixedly mounted on the frame, that is, capable of rotation in one plane only, and extend up into recesses or openings, so that the top surface of the device is only very slightly above the top of the wheel, thus giving the minimum possible clearance for a given wheel size. One pair of wheels is located substantially under the center of gravity of the device with a person reclining upon it, and a fifth caster wheel is provided at the end, out of contact with the floor or surface upon which the creeper rests when its weight is being supported on the four main wheels. Slight tilting of the device, however, lifts the two end wheels from the floor and causes the weight to be supported on two of the main wheels and the small caster, so that its direction of movement may be readily changed as desired. When a mechanic is working under a car the device would normally be carried on the four fixed wheels, so that the reaction of pulling against a wrench to tighten a nut or bolt would not require any bracing if the device is so placed that the direction of pull is at right angles to its direction of rolling.

In the embodiment of the invention illustrated herewith the creeper comprises a frame 10 consisting of a plurality of spaced slats or bars 11, here shown as being pieces of hardwood about an inch square. These longitudinal bars are held together in the desired form by three transverse rod members or bolts 12, 13 and 14, appropriate spacers 15, 16 and 17 being provided between the bars. The frame is about three feet long and somewhat less than a foot and a half wide, being of any convenient length adapted to support a person in reclining position thereon with the legs extending beyond one end. A head rest 18 may be supplied at one end if desired.

An axle 19 is shown extending across the frame near one end thereof, this axle being of heavy metal and solidly fastened to the frame by any convenient means, such as bolts 20. This axle has mounted thereon a pair of wheels, here indicated as 21 and 22. These wheels are located at opposite ends of the axle, and thus are adjacent the sides of the frame. It will be noted that they are so mounted as to extend up into the recesses or openings between adjacent frame bars 11. As will be readily seen, the top or upper surface of the frame is only slightly above the top of the wheel, so that, with a wheel of any given size, the minimum clearance from the floor is achieved.

A second axle 23 is provided, also transversely mounted on the frame, at a point about one-third of the way in from the other end. The frame is provided with a plurality of spaced mounting holes 24, the axle being here shown as mounted in the center hole by bolts 25. This axle, similar to that previously described, carries a pair of wheels 26 and 27 near opposite sides of the frame.

Reference to Fig. 3 will show the particularly sturdy construction of the axle and wheel assemblies. The wheels are here shown as comprising ball bearing races 28 fixedly mounted on the axle, these races carrying on the outer or movable portion thereof steel tires 29. Side plates 30 serve to retain grease, with which the wheel is preferably packed during assembly. The construction is such that the balls and all other parts of the wheel are of particularly large and sturdy construction, and capable of carrying a great deal of weight and withstanding a good deal of abuse and normal usage. Creepers constructed in accordance with this disclosure, in fact, have had automobiles driven over them repeatedly without any apparent ill effects. Such a procedure would, of course, completely destroy the usefulness of the ordinary type of creeper.

Near the end of the creeper removed from the head rest 18 the center bar 11 is cut away or shortened, and a metal plate 31 is carried by the adjacent bars 11, being fastened thereto by any appropriate means, such as screws 32. This plate has pivotally mounted in the center thereof a caster wheel 33, this caster being of conventional construction. The fact that it is carried by the plate 31 on the top surface of the frame enables the wheel to be mounted so that it is normally spaced from the floor when the four main wheels are in contact therewith, as may be readily seen from a consideration of Fig. 2. That is, in normal usage, the four main wheels 21, 22, 26 and 27 would carry the weight of the person reclining on the creeper, and the creeper would be rolled under a car and remain there on these wheels.

When it is desired to change the direction of movement, or in fact to make any movement other than one longitudinal of the device as shown the weight would be so shifted that the center of gravity of the device and the person lying thereon would be between the axle 23 and the small caster wheel 33, whereupon the head end of the device would rise from the ground and the device would then be carried on the two main wheels 26 and 27 and the caster wheel 33. This three-point suspension, the wheels lying substantially at the apexes of an equilateral triangle, would enable movement in any direction, since wheels 26 and 27 are rotatable independent of each other on the axle 23 and the caster 33 is rotatable in any plane desired. A plurality of holes 24, of course, are provided so that the axle 23 may be located in the best position for the mechanic generally using it. When properly located, it is not necessary to actually move the body, it being merely sufficient to exert some upward lift on the legs, rather than letting the weight be supported principally by the contact of the heels with the floor.

It will be seen from the foregoing that a very rugged and low creeper is provided, which is of such construction that it will resist side forces without the necessity of any bracing, and yet may be readily maneuvered to any desired position beneath a car. In addition, because of its construction, it may be used for a plurality of other weight-moving tasks which may be found inconvenient, such as the moving of fifty gallon drums of oil, motors taken out of a car, and the like. In this regard, additional axles and main wheels may be added, if desired, to provide further strength.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

I claim:

1. A device of the character described, including: a frame comprising a plurality of spaced members adapted to support a person in reclining position; an axle mounted transversely on said frame near one end thereof; a pair of wheels mounted on opposite ends of said axle; a second axle transversely mounted on said frame substantially under the center of gravity of said device with a person reclining thereon; a second pair of wheels mounted on opposite ends of said second axle, said four wheels all being mounted in the spaces between said members; and a fifth wheel pivotally mounted on the other end of said frame and normally out of contact with the surface on which the device is resting.

2. A device of the character described, including: a frame adapted to support a person in reclining position; an axle mounted transversely on said frame near one end thereof; a pair of wheels mounted on opposite ends of said axle; a second axle transversely mounted on said frame substantially under the center of gravity of said device with a person reclining thereon; a second pair of wheels mounted on opposite ends of said axles; and a fifth wheel pivotally mounted on the other end of said frame on a plate substantially flush with the upper surface of said frame, said fifth wheel being normally out of contact with the surface on which the device is resting.

3. A device of the character described, including: a frame adapted to support a person in reclining position, said frame having openings therein; a pair of wheels mounted on opposite sides of said frame near one end thereof for rotation about an axis transverse thereto, said wheels lying partly in a pair of said openings; a second pair of wheels mounted on opposite sides of said frame, said wheels being so mounted as to rotate about an axis transverse of said device and substantially under the center of gravity thereof with a person reclining thereon, said second pair of wheels also lying partly in a pair of said openings; and a fifth wheel pivotally mounted on the other end of said frame and normally out of contact with the surface on which the device is resting.

4. A device of the character described, including: a frame adapted to support a person in reclining position, said frame having openings therein; a pair of wheels mounted on opposite sides of said frame intermediate the ends thereof, said wheels being so mounted as to rotate about an axis transverse of said device and substantially under the center of gravity thereof with a person reclining thereon, said wheels lying partly in a pair of said openings; means at one end of said frame adapted to cooperate with said wheels to furnish the normal support for said frame, said means comprising at least one wheel partly lying in one of said openings and mounted to rotate about an axis transverse of said frame; and a fifth wheel pivotally mounted on the other end of said frame and normally out of contact with the surface on which the device is resting.

5. A device of the character described, including: a frame adapted to support a person in reclining position, the entire frame being very close to the surface on which it is adapted to be supported; a pair of wheels mounted on opposite sides of said frame intermediate the ends thereof, said wheels being so mounted as to rotate about an axis transverse of said device and substantially under the center of gravity thereof with a person reclining thereon, said wheels having a diameter greater than the distance between the bottom of said frame and said surface; means at one end of said frame adapted to cooperate with said wheels to furnish the normal support for said frame, said means comprising at least one wheel mounted to rotate about an axis transverse of said frame; and means at the other end of said frame normally out of contact with said surface, but adapted to furnish support for its end of the frame while permitting movement thereof in any direction.

JOSEPH H. HECKMAN.